(12) United States Patent
Devanneaux et al.

(10) Patent No.: US 9,118,623 B2
(45) Date of Patent: *Aug. 25, 2015

(54) SITE ACCELERATION WITH CUSTOMER PREFETCHING ENABLED THROUGH CUSTOMER-SPECIFIC CONFIGURATIONS

(71) Applicant: Akamai Technologies, Inc., Cambridge, MA (US)

(72) Inventors: Thomas P. Devanneaux, Los Altos, CA (US); Laszlo Kovacs, Foster City, CA (US); Stephen L. Ludin, Mill Valley, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/897,467

(22) Filed: May 20, 2013

(65) Prior Publication Data

US 2014/0006484 A1 Jan. 2, 2014

Related U.S. Application Data

(63) Continuation of application No. 11/647,750, filed on Dec. 29, 2006, now Pat. No. 8,447,837.

(60) Provisional application No. 60/755,908, filed on Dec. 31, 2005, provisional application No. 60/755,176, filed on Dec. 30, 2005.

(51) Int. Cl.
*G06F 15/16* (2006.01)
*H04L 29/08* (2006.01)
*G06F 17/30* (2006.01)

(52) U.S. Cl.
CPC .......... *H04L 67/02* (2013.01); *G06F 17/30902* (2013.01)

(58) Field of Classification Search
None
See application file for complete search history.

(56) References Cited

U.S. PATENT DOCUMENTS

| 6,085,193 | A  | * | 7/2000 | Malkin et al. ........................ 1/1 |
| 2003/0115421 | A1 | * | 6/2003 | McHenry et al. ............. 711/133 |
| 2005/0138143 | A1 | * | 6/2005 | Thompson .................... 709/218 |
| 2006/0031635 | A1 | * | 2/2006 | Zohar et al. ................... 711/113 |
| 2006/0069617 | A1 | * | 3/2006 | Milener et al. ................. 705/14 |

* cited by examiner

*Primary Examiner* — Mohamed Ibrahim
(74) *Attorney, Agent, or Firm* — David H. Judson

(57) ABSTRACT

A CDN edge server is configured to provide one or more extended content delivery features on a domain-specific, customer-specific basis, preferably using configuration files that are distributed to the edge servers using a configuration system. A given configuration file includes a set of content handling rules and directives that facilitate one or more advanced content handling features, such as content prefetching. When prefetching is enabled, the edge server retrieves objects embedded in pages (normally HTML content) at the same time it serves the page to the browser rather than waiting for the browser's request for these objects. This can significantly decrease the overall rendering time of the page and improve the user experience of a Web site.

20 Claims, 4 Drawing Sheets

| | |
|---|---|
| BASE | href |
| A | href |
| IMG | src, lowsrc, longdesc |
| SCRIPT | src |
| FRAME | src, longdesc |
| IFRAME | src, longdesc |
| LINK | href |
| OBJECT | codebase+[archive\|classid\|data] |
| AREA | href |
| APPLET | codebase+[archive\|src\|code\|object] |
| EMBED | codebase+[archive\|src\|code\|object] |
| INPUT | src, lowsrc |
| OFORM | action |
| BODY | background |
| TABLE | background |
| TD | background |
| TH | background |

FIG. 4

```xml
<!-- Global fetch limit settings to protect origin; should be included in all
    configurations -->

<edgeservices:prefetch>
        <status>off</status>
        <fetch>
        <max-prefetches-per-page>100</max-prefetches-per-page>
        <max-urls-per-page>100</max-urls-per-page>
        <log-r-lines>on</log-r-lines>
        </fetch>
        <fetch.limits>
                <status>on</status>
                <time-scale>ls</time-scale>
                <requests-high-watermark>20</requests-high-watermark>
                <requests-low-watermark>15</requests-low-watermark>
        </fetch.limits>
</edgeservices:prefetch>

<!-- turn prefetch on for content likely to be HTML -->

<match:uri.ext value="jsp html htm asp">
        <edgeservices:prefetch.status>on</edgeservices:prefetch.status>
</match:uri.ext>

<!-- turn prefetch on for directory defaults requested without extension -->
<match:uri.ext value=" ">
        <edgeservices:prefetch.status>on</edgeservices:prefetch.status>
</match:uri.ext>

<!-- mark prefetchable content as such -- expand this list of extensions as
    needed -->
<match:uri.ext value-"css gif jpg jpeg js ico mov png swf txt wav wma xml">
        <edgeservices:prefetch.prefetchable-object>on</edgeservices:prefetch.prefetchable-object>
        <edgeservices:prefetch.status>off</edgeservices:prefetch.status>
</match:uri.ext>

<!-- prefetch even if the HTML is already cached -->
<edgeservices:prefetch.prefetch-on-hit>on</edgeservices:prefetch.prefetch-on-hit>

<!-- when Tiered Distribution is used -->
  <edgeservices:prefetch.indirect-only>on</edgeservices:prefetch.indirect-only>
```

FIG. 5

SITE ACCELERATION WITH CUSTOMER PREFETCHING ENABLED THROUGH CUSTOMER-SPECIFIC CONFIGURATIONS

This application claims priority to Ser. No. 60/755,176, filed Dec. 30, 2005, and Ser. No. 60/755,908, filed Dec. 31, 2005.

Portions of this application contain subject matter that is protected by copyright.

BACKGROUND OF THE INVENTION

1. Technical Field

The present invention relates generally to content delivery in distributed networks.

2. Brief Description of the Related Art

A company's Web site represents its public face. It is often the initial point of contact for obtaining access to the company's information or doing business with the company. Public facing Web sites are used for many purposes. They can be used to transact commerce, where end consumers evaluate and buy products and services, and they are often linked to revenue generation and satisfying customer requests. They can be used as news and information portals for supplying the latest content for consumers. A company's Web site can be used as a customer self-service venue, where customer satisfaction is critical to loyalty in getting customers to return to the Web site. These are merely representative examples, of course. As companies place greater importance on the Internet, Web sites increasingly become a key component of a company's business and its external communications. As such, the capability and flexibility of the supporting Internet infrastructure for the Web site becomes mission-critical. In particular, the infrastructure must provide good performance for all end user consumers, regardless of their location. The site must scale to handle high traffic load during peak usage periods. It must remain available 24×7, regardless of conditions on the Internet. When performance, reliability, or scalability problems do occur, Web site adoption and usage can be negatively impacted, resulting in greater costs, decreased revenue, and customer satisfaction issues.

It is known in the prior art to off-load Web site content for delivery by a third party distributed computer system. One such distributed computer system is a "content delivery network" or "CDN" that is operated and managed by a service provider. The service provider typically provides the service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS request handling, provisioning, data monitoring and reporting, content targeting, personalization, and business intelligence. The term "outsourced site infrastructure" means the distributed systems and associated technologies that enable an entity to operate and/or manage a third party's Web site infrastructure, in whole or in part, on the third party's behalf.

FIGS. 1-2 illustrate a known CDN infrastructure for managing content delivery on behalf of participating content providers. In this example, computer system 100 is configured as a CDN and is managed by a service provider. The CDN is assumed to have a set of machines 102a-n distributed around the Internet, and some or even all of these machines may be located in data centers owned or operated by third parties. Typically, most of the machines are servers located near the edge of the Internet, i.e., at or adjacent end user access networks. A Network Operations Command Center (NOCC) 104 may be used to administer and manage operations of the various machines in the system. Third party content sites, such as Web site 106, offload delivery of content (e.g., HTML, embedded page objects, streaming media, software downloads, and the like) to the distributed computer system 100 and, in particular, to "edge" servers. Typically, this service is provided for a fee. In one common scenario, CDN content provider customers offload their content delivery by aliasing (e.g., by a DNS canonical name) given content provider domains or sub-domains to domains that are managed by the service provider's authoritative domain name service. End users that desire such content may be directed to the distributed computer system to obtain that content more reliably and efficiently.

The distributed computer system typically also includes other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers. As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP Web proxy 207, a name server 208, a local monitoring process 210, a distributed data collection process 212, and the like. For streaming media, the machine typically includes one or more media servers, such as a Windows Media Server (WMS) or Flash 2.0 server, as required by the supported media formats.

The CDN may be configured to provide certain advanced content delivery functionality, for example, in the case where the edge server does not have the requested content (e.g., the content is not present, the content is present but is stale, the content is "dynamic" and must be created on the origin server, and the like). In such circumstances, the edge server must "go forward" to obtain the requested content. An enhanced CDN often provides the capability to facilitate this "go forward" process. Thus, it is known to provide a "tiered distribution" by which additional edge servers in the CDN provide a buffer mechanism to the Web site origin server. In a tiered distribution scheme, a subset of the edge servers in the CDN is organized as a cache hierarchy, so that a given edge server in an edge region has an associated "parent" region that may store an authoritative copy of certain requested content. A cache hierarchy of this type is then controlled at a fine-grain level using edge server and parent server configuration rules that are provided through the distributed data transport mechanism. U.S. Pat. No. 7,133,905, which is assigned to the assignee of the present application, describes this scheme. Another advanced function that may be implemented is quite useful when an edge server has to go forward to an origin server for dynamic or non-cacheable content. According to this technique, the CDN is configured so that a given edge server has the option of going forward (to the origin) using intermediate CDN edge nodes instead of relying upon default BGP routing. In this function, the CDN performs tests to determine a set of alternative best paths between a given edge server and the origin server, and it makes those paths known to the edge server dynamically, typically in the form of a map. When the edge server needs to go forward, it examines the map to determine whether to go forward using default BGP or one of the alternate paths through an intermediate CDN node. This path optimization process is quite useful when the content in question must be generated dynamically, although the process can be used whenever it is necessary for a given edge server to obtain given content from a given source. This performance-based path optimization scheme is described in U.S. Publication No. 2002/0163882, which is also assigned to the assignee of the present application.

BRIEF SUMMARY OF THE INVENTION

A CDN edge server is configured to provide one or more extended content delivery features on a domain-specific, customer-specific basis, preferably using configuration files that are distributed to the edge servers using a configuration system. A given configuration file preferably is XML-based and includes a set of content handling rules and directives that facilitate one or more advanced content handling features, such as content prefetching. When prefetching is enabled, the edge server retrieves objects (such as images and scripts) embedded in pages (normally HTML content) at the same time it serves the page to the browser rather than waiting for the browser's request for these objects. This can significantly decrease the overall rendering time of the page and improve the user experience of a Web site. Using a set of metadata tags, prefetching can be applied to either cacheable or uncacheable content. When prefetching is used for cacheable content, and the object to be prefetched is already in cache, the object is moved from disk into memory so that it is ready to be served. When prefetching is used for uncacheable content, the retrieved objects are uniquely associated with the client browser request that triggered the prefetch so that these objects cannot be served to a different end user. By applying metadata in the configuration file, prefetching can be combined with tiered distribution and other edge server configuration options to further improve the speed of delivery and/or to protect the origin server from bursts of prefetching requests.

The foregoing has outlined some of the more pertinent features of the present invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 4 is a table of HTML elements that may be prefetched based on settings in a customer-specific configuration file; and FIG. 5 is a representative default set of metadata to enable the prefetching feature according to the present invention.

DETAILED DESCRIPTION OF AN ILLUSTRATIVE EMBODIMENT

Figure 1:
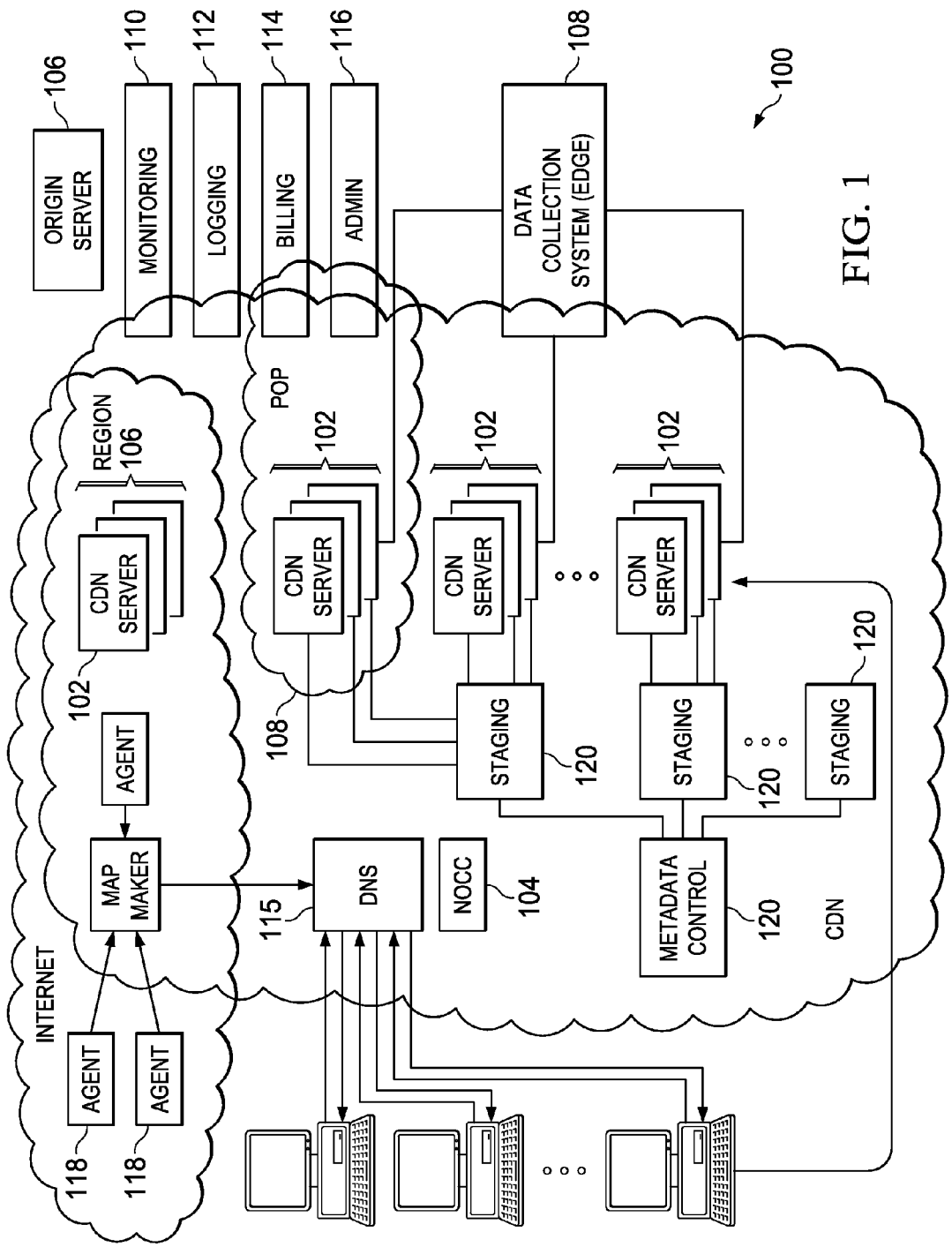
FIG. 1 is a representative prior art content delivery network in which the present invention may be implemented.
Figure 2:
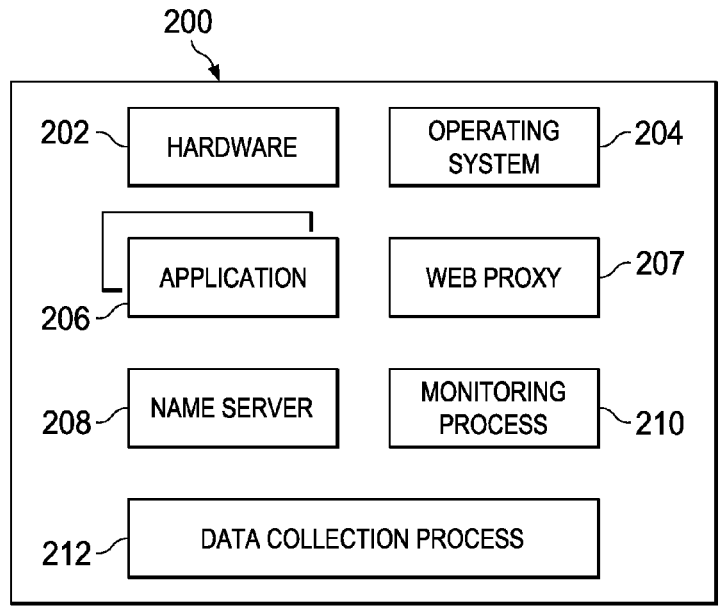
FIG. 2 is a representative edge server of the content delivery network of FIG. 1.
Figure 3:
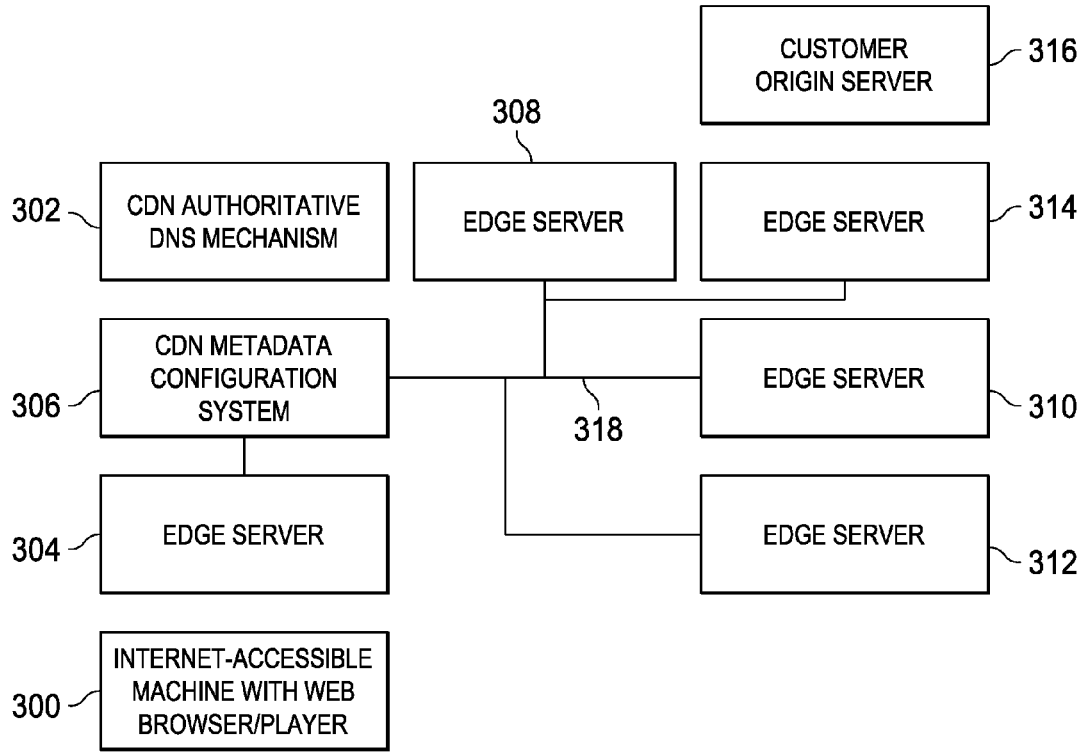
FIG. 3 is a portion of the CDN of FIG. 1 in which content prefetching is enabled according to the present invention.

As seen in FIG. 3, a CDN customer has off-loaded all or some of its content delivery requirements to the CDN service provider in a well-known manner. In this case, the CDN customer operates a site at the origin server 316. An Internet-accessible client 300 (e.g., an end user client machine having a browser and media player) has been directed by CDN authoritative DNS mechanism 302 to a nearby edge server 304. This process is described, for example, in U.S. Pat. Nos. 6,108,703, 6,553,413 and 6,996,616. Edge server 304 may be configured as described above and illustrated in FIG. 2. This server includes a management process that provides the content prefetching functionality of the present invention, as will be described in more detail below.

The given edge server 304 may be located in a set (or "region") of edge servers that are co-located at a given Internet-accessible data center. For convenience, only one edge server per region is shown. Content handling rules are configured into each edge server, preferably via a metadata configuration system 306. As shown, the configuration system provides edge server content control metadata via links 318, which themselves may include other infrastructure (servers, and the like). U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server 316. If configured appropriately, given subsets of edge servers, such as edge servers 304 and 310, may comprise a cache hierarchy so that edge server 304 may "go forward" to a CDN parent instead of to the origin server as needed. This tiered distribution is described in U.S. Pat. No. 7,133,905, as noted above. Also, if configured appropriately, the CDN may provide overlay path routing to enable the edge server 304 to go forward to the origin server 316 through an alternate CDN path, such as the path through edge server 308, or through edge server 312, depending on whether one of these alternative paths provides better performance than a default BGP path. As noted above, this performance-based overlay path delivery scheme is described in U.S. Publication No. 2002/0163882. The disclosures of each of the above-identified references are incorporated herein by reference. As also seen in FIG. 3, an edge server 314 may be co-located with the customer origin server, although this is not required.

According to the present invention, a given CDN edge server is configured to provide one or more extended content delivery features. To this end, the CDN edge servers are configurable to provide these delivery features on a customer-specific, customer domain-specific, preferably using XML-based configuration files that are distributed to the edge servers using a metadata configuration system such as described above. A given XML-based configuration file includes a set of content handling rules and directives that facilitate one or more advanced content handling features. Thus, for example, when an edge server management process receives a request for content, it searches an index file for a match on a customer hostname associated with the request. If there is no match, the edge server process rejects the request. If there is a match, the edge server process loads metadata from the configuration file to determine how it will handle the request. Thus, for example, the metadata for the hostname may indicate whether to serve the request from cache or from the origin. If the metadata indicates that the request is associated with cached or cacheable content, the information may then direct the edge server to look for the content in a local cache or, failing that, to fetch the content from a CDN cache hierarchy parent node. If content is cacheable, the metadata may instruct the edge server process to apply given content handling directives. One such set of directives implement a content prefetch function, which will be explained in detail below. If, on the other hand, the configuration file indicates that the edge server should go forward to handle the request (because, e.g., the request involves a transaction that must occur at the origin server) the metadata may indicate how the edge server should go forward, e.g., using path optimization to try to reach the origin using intermediate CDN paths. Other metadata may control how a given edge server establishes and maintains connections with one or more other edge servers or other machines, or how the edge server should deliver the content to the requesting end user browser once it has been obtained. In any event, a set of content handling directives are set forth in the XML configuration file for a given customer domain and used to control the edge server to provide these advanced functions.

As noted above, in one embodiment, an XML-based configuration file controls an edge server to provide an enhanced content delivery function, namely, content prefetching, on a per-customer, per customer domain-basis. Using this service, a given CDN customer can set up (directly or with the assistance of the CDN service provider) an edge server handling configuration for all or part of the customer's Web site or other content to be delivered over the CDN. A participating content provider can be a formal Web publisher, or the content in question can be user-generated content (UGC). In a typical use scenario, the edge server is shared among participating content providers, and one or more of such providers establish a prefetching configuration (by default, or as a custom configuration) that is enabled and enforced on the edge server. Thus, for example, when prefetching is enabled, the edge server retrieves images and scripts embedded in pages (normally HTML content) at the same time it serves the page to the browser rather than waiting for the browser's request for these objects. This operation can significantly decrease the overall rendering time of the page and improve the user experience of a Web site.

Although the remainder of this description focuses primarily on the content prefetching capability, one of ordinary skill in the art will appreciate that, by using XML-based configurations, this function can be combined readily with other edge server functions that are also defined in such customer-specific, domain-specific configurations. These functions include, without limitation, path optimization (e.g., for non-cacheable or dynamic content), client-server (e.g., edge server-to-edge server) TCP connection optimizations, content compression, and the like. Path optimization, as described in U.S. Publication No. 2002/0163882, the disclosure of which is incorporated by reference, significantly decreases latency when the edge server has to go forward to the origin (or other source), which is often required to facilitate transactions (or other occurrences) that call for dynamic content generation. TCP connection optimization involves adjusting one or more TCP settings (e.g., congestion window size, retransmit timeout, packet reordering, and the like), which reduces edge server-to-edge server communication latency, as does content compression.

The following describes a content prefetching enhancement.

As will be seen, prefetching can be applied to either cacheable or uncacheable content. When prefetching is used for cacheable content, and the object to be prefetched is already in cache, the object is moved from disk into memory so that it is ready to be served. When prefetching is used for uncacheable content, the retrieved objects are uniquely associated with the client browser request that triggered the prefetch so that these objects cannot be served to a different end user. By applying metadata in the configuration file, prefetching can be combined with tiered distribution to further improve the speed of object delivery and to protect the origin server from bursts of prefetching requests.

In one embodiment, the following restrictions apply when determining whether to scan a response body for prefetchable content or to prefetch a referenced object: the edge server applies prefetching only to responses with a content-type header that begins with certain extensions (e.g. text/html, or some other given format), only responses with HTTP status codes of 200 or 404 are scanned for prefetchable objects; objects to be prefetched are referenced using the same protocol (HTTP or HTTPS) as the client used to request the original page; and object references use the same hostname as the original request.

The following provides a more detailed description of the prefetching feature including descriptions of the request flow, the conditions for scanning the base page, the content of prefetch requests, and composition of the browser-ID for uncacheable content. By way of background, without prefetching, the edge server requests content from the origin server (or a parent edge server) only when it receives a request for the content from an end client (browser). This means that images referenced by a page are not retrieved until the end user's browser has received and read the page and requested those images. The normal request flow is as follows: the browser requests the page from the edge server, the edge server retrieves the page from cache (or from the origin server if the page is not already in cache), the edge server returns the page to the browser, the browser scans the contents of the page and requests the objects referenced by the page, the edge server retrieves the images and other content from cache (or from the origin server if the objects are not already in cache), and the edge server returns the requested objects to the browser. With prefetching enabled, however, the edge server actively scans the page for embedded images and scripts and retrieves these objects before they are requested by the end-user's browser. The new request flow is as follows. The end-user client requests a page from the edge server; the edge server retrieves the page from cache (or from the origin server if the page is not already in cache). The edge server then scans the page (usually HTML) for referenced images and scripts at the same time it serves the page to the browser. Note that it is not required that every response is scanned. The conditions that determine whether a response is scanned are described below. Now, overlapping in time, the following events occur: the edge server retrieves the referenced images and scripts from cache (or from the origin server if the objects are not already in cache), and the browser scans the page and requests the objects referenced by it. The edge server returns the requested objects to the client browser.

Preferably, when prefetching is used, the edge server scans appropriate responses from the origin. Not every response is required to be scanned. The edge server scans the response and begins prefetching embedded objects if one or more of the following conditions are true (and preferably all of them must be): a prefetching status is "on" for this request, an HTTP status code of the response sent to the client is 200 or 404, a response content-type starts with one of a set of configured strings (by default, the edge server scans the response only if the content type starts with text.html), no preset limit (a configurable threshold) on an average number of prefetch requests per unit time has been reached, a prefetch-on-hit metadata tag is "on" if the page is already in cache, an indirect-only metadata tag is "off" if the edge server is an edge server that connects directly to the origin, a push.status metadata tag is "off" if the edge server is connecting to a cache hierarchy parent, and the edge server received a special request header from a child peer (that reads X-Cdnsp-Prefetch: type=push-to-edge) if the edge server is a cache hierarchy parent.

When the edge server identifies a response that should trigger prefetching, it parses the page (usually HTML) as it sends the response to the client. Each time the edge server encounters a tag in the page that is a candidate for prefetching (with two exceptions noted below), it creates a dummy request for the URL for this object and applies metadata to the request. Preferably, this is done only for the first instance of an object reference, so that multiple references to the same object within the page do not result in multiple requests for that object. The following are several possible settings for scanning a page: scan using an HTML processor (which treats the entire page as SGML and scans for URLs contained in specific elements as listed below); scan using a regular expressions processor (this treats the entire page as plaintext and uses regular expression rules to identify links to prefetch), and/or scan using the HTML processor for the defined tags, using a regular expressions processor on the <script> elements to identify URLs within JavaScript sections. By default, HTML elements that generate candidates for prefetching are <IMG> and <SCRIPT>, although optionally a given configuration file can be used to configure prefetching of objects referenced by any of the elements listed in the table in FIG. 4. Any type of content object may be prefetched and not just images and scripts. After metadata is applied to the dummy object request, the edge server decides to prefetch an object if the following are true: prefetchable-object metadata is "on" for this object, the object is not found in cache (if the object is found in cache, preferably it is moved to a hot object cache), and no prefetching limit has been reached. In an alternative embodiment, a regular expression parser in the edge server allows scanning of any text file for prefetch candidate URLs. This is particularly useful when the response is JavaScript. If the regular expressions processor is used, the configuration file must enclose the metadata within a match on a given content-type or file extension of the object to avoid having these settings apply to other parsing. Using the configuration file, it is also possible to define regular expression rules for selecting URLs within the JavaScript sections of an HTML page. This can be done by defining the regular expression matching rules in the configuration file but then leaving the processor type set to HTML; this will cause all <script> sections in the HTML to be scanned with the regular expressions processor.

As noted above, when the page is scanned for prefetch candidates, an exception may prevent an otherwise qualified URL from being prefetched. For example, in one embodiment, an exception that may cause an object to be skipped is that the object's URL does not have the same hostname as the base page. Another possible exception is that protocol (HTTP or HTTPS) of the embedded object reference is not the same as the request that triggered the prefetch. This is not a limitation of the prefetching functionality of the invention, however, as in certain circumstances it may be desired to allow the edge server to prefetch objects from different hostnames, or if a protocol match is not present.

When the edge server creates the requests to prefetch embedded objects, the request typically contains a number of components. These include, for example, a header X-Cdnsp-Prefetch-Object, which is used to prevent these requests from triggering further prefetching. The header preferably is also sent to the origin, and it may include a current level of recursion when recursive prefetching is enabled (as described below). The request may also include the request headers from the base page (including all cookies, regardless of whether the path specified for a cookie matches the path for the embedded object). Preferably, the request also includes cookies created from any Set-Cookie headers in the response page, where the domain of the Set-Cookie matches the hostname for the request. Preferably, the edge server ignores path and secure parameters of the Set-Cookie headers. If necessary, using the configuration file the edge server can be controlled to select which cookies are used in the prefetch request. By default, preferably all cookies and Set-Cookies that match the hostname are included, although metadata can be set to include or ignore cookies by name.

By default, when prefetching is enabled, the edge server will prefetch objects that are non-cacheable along with those that are cacheable. The server may also prefetch objects that have a zero second TTL assigned to them. In such case, preferably the edge server holds these objects in a separate buffer; they expire after a short time, can be served only once, and can be served only to the same user that requested the page that references them (e.g., based on the browser-ID). Further, preferably the edge server can prefetch two kinds of non-cacheable objects: objects with "no-store" or "bypass-cache" metadata, and objects that are non-cacheable based on their response headers (for example, a Vary: header). Using metadata in the configuration file, however, the edge server can be configured to not prefetch no-store or bypass-cache content and not store uncacheable objects that were prefetched. This may be useful when prefetching is used in combination with path optimization (for dynamic content) as will be described below.

If desired, the browser-ID buffer may include cacheable objects with very short TTLs. This may be desirable if a TTL is only a few seconds, and the number of objects included in an HTML page is large enough to prevent the browser from requesting those objects before then expire in cache. If a prefetched object's TTL expires before the browser requests it, the edge server must re-request the object when the browser request finally arrives, and the benefit of prefetching is lost for this object. When the browser-ID is applied to objects with short TTL's, preferably they are handled just like uncacheable objects. In particular, they expire after a short time, can be served only once, and can be served only to the same user that requested the page that references them.

When a user requests a page and objects are prefetched, the objects preferably are associated with a "browser-ID" that uniquely identifies the user. In one embodiment, the edge server computes a "browser-ID" based on the IP address, cookies, and request headers of the user request. By default, all cookies are used in the computation along with the User-Agent and Authorization headers. Special rules may be applied for users behind proxies or with no user session cookies, as in such case there is no guarantee the browser-ID will identify a unique user. In one embodiment, the browser-ID is a value that is generated by applying a given function to a concatenation, e.g., the IP address of the browser (as seen by the edge server), a hash calculated over one or more cookie values, and a hash of one or more header values.

Generally, when a browser requests content from a domain, it will open only a few connections to the server and make its requests across that limited number of connections. An edge server does not limit its forward connections the way a browser does. Preferably, the edge server maintains persistent connections, and it reuses those established connections as they are available. If there are more requests to satisfy then there are connections available, the edge server preferably opens new connections. It relies on the origin server to limit the number of connections. If an edge server performed prefetching for an HTML page that contained many references to content not in the edge server's cache, that edge server could attempt to open many connections with the origin server. If this occurred across the network of edge servers simultaneously, the origin server could be overloaded with requests from the edge servers. To avoid this problem, preferably some degree of rate limiting is applied to the prefetching functions. To this end, there is a set of metadata tags for limiting the number of prefetch requests that can be in process to the origin (or other) server at one time. These tags control the time period over which to measure the average number of requests, an upper bound for prefetch requests in process (beyond this point prefetch requests are blocked), a lower bound for prefetch requests in process (after prefetching has been blocked, it can restart once the number of requests in process drops to this level), a maximum number of URLs to scan for prefetching within a single page, and a maximum number of prefetch requests to generate for a single page.

The above description of the prefetching function has assumed that the objects referenced within the base page do not themselves contain prefetchable objects. This is not always the case. For example, an HTML page could include another HTML section through use of an <iframe> tag, and the included HTML might make reference to an image. In this case, the base page cannot be fully rendered by the browser until the second HTML section and its embedded image have both been fetched. For cases like this, it might be advantageous to prefetch recursively. That is, to prefetch objects referenced by prefetched HTML. Using the configuration file settings, recursive prefetching can be enabled, including controlling how many level of prefetching are performed. The recursion feature can also be set to be used only on URLs found in HTML tags that define links (i.e., A, AREA, LINK or FORM tags), as it is not desirable to prefetch links recursively.

It may also be desirable to prefetch when tiered distribution is enabled between edge server regions. To this end, a request header X-Cdnsp-Prefetch is used between cache hierarchy edge server peers. When prefetching is done from an edge server process to a parent edge server, the value of the header is X-Cdnsp-Prefetch: type=pull-from-edge. In contrast, when the prefetching is done from the parent edge server process, the value of the header is X-Cdnsp-Prefetch: type=push-to-edge. Push-to-edge prefetching typically is not used by default. When enabled, however, the parent edge server process issues an Cdnsp_PREFETCH_PUSH request to a requesting edge server process as soon as the response comes in to the parent edge server. The protocol (HTTP or HTTPS) is the same as for the embedded object. The request includes request headers that are sent as early as possible (preferably even before the parent edge server goes forward for the embedded object). The response headers and body of the prefetched object are sent as soon as the parent receives them from the origin. In the event the parent edge server decides to abort the request, it sends an HTTP 500 response to the edge server, which will preserve the persistent connection. Preferably, these requests always use persistent connections (i.e., they either have a body content-length or use chunking, and they do not get closed by the edge server process). Also, preferably the edge server processes involved in such prefetching authenticate one another to prevent malicious users from forcing arbitrary objects into the edge server cache. The Cdnsp_PREFETCH_PUSH request also may contain a line with x-Csnsp-Prefetch-Browser-ID. The PUT body of this request contains first the response headers from the original object, then the response body. After the edge server process parses the request headers, it will "plug" the parsing of the rest of the response on the already existing code on the forward side.

According to a feature of the present invention, a given CDN customer can establish a custom prefetching configuration for given site or other content, preferably using an XML-based configuration file that is delivered to and used by a given edge server to implement a prefetching directive. Typically, the same configuration file is delivered to all of the edge servers, and this configuration file may be changed dynamically using the metadata configuration system.

A configuration file includes directives that identify the appropriate content for prefetching and how the feature should be enabled for that content. The following section provides additional detail regarding the metadata related to configuring the prefetch feature. Preferably, all metadata used for prefetching starts with a given tag such as edgeservices:prefetch. While there are many metadata tags for use in tuning the configuration, most of these tags are not necessary in the customer's configuration file, as default settings (as described below) may be adequate. A minimal set of metadata to enable prefetching for a given content provider domain is shown in FIG. 5. The meaning of this metadata (among other prefetching directives) is described below.

In particular, the following is representative list of prefetch metadata:

Preferably, prefetching is enabled through a single metadata tag:

<edgeservices:prefetch.status>on</edgeservices:prefetch.status>

As noted above, when this metadata applies to a request, the corresponding response will be scanned for prefetchable objects if the response has an HTTP 200 or a 404 status code and a Content-Type header that begins with "text/html" or other content types defined in edgeservices:prefetch.content-types.

By default, only responses of type "text/html" are scanned for prefetchable objects. Other content types can be added using the following tag. Note that a wildcard should be used if the content-type header contains more than the simple type definition. The tag takes a space separated list of content-type strings:

<edgeservices:prefetch.content-types>text/html*</edgeservices:prefetch.content-types>

By default, preferably the edge server scans responses using an SGML parser to identify HTML tags that contain candidate URLs for prefetching. As described, it may be desired to scan the page as plaintext using a regular expression parser. Thus, to scan the response as plaintext using a regular expressions parser, the parser-type is set to regex using the following tag:

```
<edgeservices:prefetch.parser-type>regex</...>
```

In the above case, a regular expression processor is turned on and is provided a list of rules. In particular, if it is desired to scan either the entire page or the JavaScript sections of an HTML page using regular expressions, a set of regular expression rules are defined for the parser to use. Whenever parser-type is set to regex the entire page is scanned using these rules. If the parser-type is set to html the rules are used only within the <script> tags, and the rest of the page body is scanned using the SGML processor. Note also that regardless of the parser type setting, the content-type of the response must be listed in the prefetch.content-types tag for the edge server to parse the response. Preferably, these tags are inside a match on the response content-type, or inside a match on uri extension of the object, wherein Prefetch.regex.rule is a listable tag set that contains a perl-compatible regular expression along with a string and flags:

```
<edgeservices:prefetch.regex>
    <status>on</status>
    <rule>#&1g;img\s+src\s+=\s+[\'\"]?(.*?)[\'\"]?>#$1#gi</rule>
</edgeservices:prefetch.regex>
```

The following metadata tag indicates whether or not an object is prefetchable. This tag should be set explicitly, as the default value preferably is off:

```
<edgeservices:prefetch.prefetchable-object>on</edgeservices:prefetch.prefetchable-object>
```

If this flag is on, no prefetching occurs if the edge server goes directly to the origin:

```
<edgeservices:prefetch.indirect-only>off</edgeservices:prefetch.indirect-only>
```

If a prefetch-on-hit flag is off, the edge server does not prefetch if the request for the HTML is a hit (an in-memory hit, an ICP hit, or an IMS hit). If the flag is on, the edge server prefetches from cached HTML (i.e., the server goes forward for non-cached or expired objects, and moves cached objects from disk into hot object cache). If the cache hit happens on the edge server, then the prefetching is done from the edge server even if push.status is true (because the parent would not get any request):

```
<edgeservices:prefetch.prefetch-on-hit>off</edgeservices:prefetch.prefetch-on-hit>
```

A prefetch-on-304 flag controls whether the edge server will prefetch if the response to the client is an HTTP 304. The default is "off," so the server will scan the page and prefetch embedded objects only when the response to the client is an HTTP 200 for the base page. If this flag is on, the edge server also prefetches when a 304 is returned to the client. When this flag is on, pre fetch-on-hit should be on as well:

```
<edgeservices:prefetch.prefetch-on-304>off</edgeservices:prefetch.prefetch-on-304>
```

By default, the edge server will prefetch after processing dynamic content assembly (DCA) requests. This means that only objects that are referenced in the HTML response served to the client browser are actually prefetched. If it is desired to prefetch all objects referenced separately by DCA fragments and containers, the following tag preferably is turned off:

```
<edgeservices:prefetch.after-dca>off</edgeservices:prefetch.after-dca>
```

When the browser-id status flag is on (the default setting), the edge server temporarily keeps prefetched non-cacheable objects (and objects with a zero-second TTL) in memory. These objects are associated with the user's browser-id, and they can only be served once. The non-cacheable objects preferably are never stored on disk:

```
<edgeservices:prefetch.browser-id.status>on</edgeservices:prefetch.browser-id.status>
```

When prefetching non-cacheable content, the browser-ID can be calculated using a default calculation, or a set of metadata tags can be used to define what components (e.g., IP address mask size, cookies and headers) are used for the calculation.

A fetch separator controls the actual retrieval of content through prefetching using metadata tags that are now described.

In particular, a first tag is used to define a list of cookies that get sent to the origin when the edge server prefetches embedded objects. By default, the list is *, so all cookies are sent. Preferably, the edge server also takes into account the "Set-Cookie" headers from the HTML response:

```
<edgeservices:prefetch.fetch.pass-cookies>*</edgeservices:prefetch.fetch.pass-cookies>
```

A second tag is used to define a list of cookies that do not get sent to the origin when the edge server prefetches embedded objects. By default, this list is empty:

```
<edgeservices:prefetch.fetch.ignore-cookies>(empty)</edgeservices:prefetch.fetch.ignore-cookies>
```

The following tag is used to define a maximum number of distinct URLs the edge server will consider prefetching inside the HTML page. For each URL, the edge server creates a request object, applies metadata, checks that the prefetchable-object flag is set, checks that the object is not already in memory, and then fetches it if necessary:

```
<edgeservices:prefetch.fetch.max-urls-per-page>20</edgeservices:prefetch.fetch.max-urls-per-page>
```

The following tag is used to define a maximum number of embedded objects for which the edge server is going forward:

```
<edgeservices:prefetch.fetch.max-prefetches-per-page>15</edgeservices:prefetch.fetch.max-prefetches-per-page>
```

The following tag is a space-separated list of HTML elements. The possible values are A, IMG, SCRIPT, FRAME, IFRAME, LINK, OBJECT, AREA, APPLET, EMBED, INPUT, OFORM, BODY, TABLE, TD, TH, BASE and INCLUDE. This is just a representative list, and the list may be expanded to include any tags that can reference external objects. Preferably, the edge server only considers prefetching objects inside these elements:

```
<edgeservices:prefetch.fetch.html-elements>SCRIPT
IMG</edgeservices:prefetch.fetch.html-elements>
```

When the HTML returned to the user is compressed, the edge server must unzip it internally to parse it. If the following flag is on, the server will not try to uncompress the HTML and therefore will not be able to prefetch the embedded objects.

```
<edgeservices:prefetch.fetch.donot-
uncompress>off</edgeservices:prefetch.fetch.donot-uncompress>
```

By default, objects can only be prefetched from the same domain as appeared in the request for the HTML page; this restriction can be relaxed by using the following tag:

```
<edgeservices:prefetch.fetch.allow-same-
map>off</edgeservices:prefetch.fetch.allow-same-map>
```

When this flag is "on" prefetching will be allowed from domains other than the domain of the original request for the HTML, provided (for example) that those domains use the same CDN map. For example, if the client requests a page from html.example.com and that page contains references to images at images.example.com, and both these domains are aliased (through a DNS CNAME) to axxx.g.cdnsp.net then the prefetch requests can go forward. When the map comparison is performed, an identifier (e.g., a serial number) in the map name (represented by xxx above) is relevant, and only prefetch requests that use the same serial number are allowed to go forward. The edge server can allow prefetch requests regardless of the serial number in the map name by turning off the tag:

```
<edgeservices:prefetch.fetch.serial-must-
match>off</edgeservices:prefetch.fetch.serial-must-match>
```

This metadata is used to define a maximum number of objects the edge server will try to prefetch without going back to a main processing loop (no prefetching):

```
<edgeservices:prefetch.fetch.urls-before-
yield>5</edgeservices:prefetch.fetch.urls-before-yield>
```

The edge server will stop loading embedded objects from disk after it reads more than a threshold set by the following metadata:

```
<edgeservices:prefetch.fetch.disk-abort-
threshold>10KB</edgeservices:prefetch.fetch.disk-abort-threshold>
```

The edge server will stop loading embedded objects from the network after it reads more than a threshold set by the following metadata (this will close the forward connection if no user request has been received yet):

```
<edgeservices:prefetch.fetch.network-abort-
threshold>1MB</edgeservices:prefetch.fetch.network-abort-threshold>
```

Recursive prefetching is enabled with the tags in the "recursion" selector:

```
<edgeservices:prefetch.recursion>
```

The number of levels of prefetching is controlled by the tag:

```
<edgeservices:prefetch.recursion.depth>1</...>
```

This tag specifies a maximum allowed depth for recursive prefetching. A default value is "1," which means that recursive prefetching is disabled. A minimum value is "1,", and the absolute maximum value is "5." Preferably, the value "0" is not valid; to disable prefetching, the <prefetch.status> tag is set to "off" instead. When performing recursive prefetching on SGML content (i.e., with the parser-type tag set to HTML), recursive prefetching can be applied to tags that define links using the following tag:

```
edgeservices:prefetch.recursion.allow-link-recursion>off</...>
```

A default value is "off." When this tag is off, recursive prefetching does not apply to HTML tags that define links, i.e., preferably tags A, AREA, LINK, FORM are prefetched at a first level (the client-requested HTML) if declared in the list of tags to prefetch but are not prefetched at the recursive levels below. For example, when this tag is "off," the edge server will not recursively prefetch objects embedded in <a href= . . . >, but will recursively prefetch objects embedded in <frameset src= . . . >. If the tag is set to "on," the edge server will recursively prefetch from the link tags as well as the object references. When the edge server makes a forward request to prefetch an object, it adds the request header X-Cdnsp-Prefetched-Object. The value preferably is a current level of recursion (starts at 1, and goes until <recursion-.depth>).

The following metadata is used to apply rate limiting to prefetch requests. It can restrict prefetching based on either or both the raw number of requests (the "count") and the amount of bandwidth the requests have used (the "bandwidth"). Further, the metadata can be set for specific types of prefetch requests (for example, requests to the origin) or for "all" prefetch requests:

```
<edgeservices:prefetch.fetch.rate-control>
    <status>on</status>
    <type></type>
    <high-count>0</high-count>
    <low-count>0</low-count>
    <high-bandwidth>0B</high-bandwidth>
    <low-bandwidth>0B</low-bandwidth>
    <time-scale>30s</time-scale>
</edgeservices:prefetch.fetch.rate-control>
```

The high-bandwidth tag specifies the point at which rate limiting will be applied based on bandwidth usage of the prefetch requests. The high-count tag specifies the point at which rate limiting will be applied based on the number of prefetch requests of the given type. Once rate limiting has been applied to prefetch requests based on their bandwidth consumption, the low-bandwidth tag is the point at which prefetching can resume. When the bandwidth consumption drops to this level, new prefetch requests can be generated. Once rate limiting has been applied to prefetch requests based on their number, the low-count is the point at which prefetching can resume. When the number of outstanding prefetch requests drops to this level, new prefetch requests can be generated. The status tag controls whether the prefetch rate limiting feature is used. The time-scale tag defines the time scale over which the moving average of prefetch requests (count) or bytes used (bandwidth) are measured. So, for example, with the default setting, if the high-count number of prefetch requests were generated in 30 seconds, no more requests could be generated until the low-count number of prefetch requests was reached within a 30 second measurement window. The type tag specifies the type of request for which rate controls should be imposed. Valid values may include all (applies to all prefetch related requests, and no other separate rate control settings apply), disk (requests resulting in a disk hit), cache-h (requests resulting in cache-h or path optimization fetch or push), and origin (requests resulting in a forward request to the origin).

To enforce fetch limits when the edge server goes forward for prefetching, the following tags can be used:

<edgeservices:prefetch.fetch.limits.status>on</edgeservices: prefetch.fetch.limits.status>

Preferably, these limits are based on the number of prefetch requests per forward hostname, and they are available to be overridden at the level of customer configuration. Also, preferably only prefetch requests that must go forward to the origin are counted against the limit.

The edge server will stop prefetching if the average number of prefetching requests per second reaches this watermark. A value of 0 means that there is no watermark:

<edgeservices:prefetch.fetch.limits.requests-high-watermark>10</ edgeservices:prefetch.fetch.limits.requests-high-watermark>

Once fetch limits have been imposed, the edge server will stop prefetching until the average number of prefetching requests per second reaches this threshold. This setting should never be zero when limits are applied, otherwise the server could stop prefetching for a considerable period of time:

<edgeservices:prefetch.fetch.limits.requests-low-watermark>5</ edgeservices:prefetch.fetch.limits.requests-low-watermark>

The edge server will stop prefetching if the average number of bytes per second reaches this threshold. A value of 0 means that there is no watermark:

<edgeservices:prefetch.fetch.limits.bandwidth-high-watermark>100KB</ edgeservices:prefetch.fetch.limits.bandwidth-high-watermark>

Once fetch limits have been imposed, preferably the edge server will stop prefetching until an average number of bytes per second reaches this threshold. This setting should never be zero when limits are applied, otherwise the server could stop prefetching for a considerable period of time:

<edgeservices:prefetch.fetch.limits.bandwidth-low-watermark>80KB</ edgeservices:prefetch.fetch.limits.bandwidth-low-watermark>

The following metadata is the time scale used in the computation of the exponentially-weighted moving average for the number of requests per second and for the bandwidth. The larger it is, the slower the moving average will vary:

<edgeservices:prefetch.fetch.limits.time-scale>30s</edgeservices:prefetch.fetch.limits.time-scale>

The following metadata describes how to control the "push-to-the-edge" function. If this flag is on, the prefetching type between edge servers in a cache-hierarchy configuration is "push-to-the-edge." Otherwise, it is "pull-from-the-edge." This flag is ignored if the edge server goes directly to the origin:

<edgeservices:prefetch.push.status>Off</edgeservices:prefetch.push.status>

The following is the baseline tag used to disable all "push" code (both client and server side):

<edgeservices:prefetch.push.enable>on</edgeservices:prefetch.push.enable>

When a "push" race condition happens (in other words, when the browser request for an embedded object comes in before the child edge server receives the "pushed" object from its parent), the server will close the connection to the second response (therefore losing the persistent connection) if its size is bigger than a threshold set by this tag:

<edgeservices:prefetch.push.close-response-size-threshold>200KB</ edgeservices:prefetch.push.close-response-size-threshold>

This baseline tag is used to disable the prefetching feature globally if necessary. The default value is on:

<edgeservices:prefetch.enable>on</edgeservices:prefetch.enable>

This baseline tag is used to temporarily stop prefetching if a given edge server CPU utilization percent is above this threshold:

<edgeservices:prefetch.percent-threshold>90</edgeservices: prefetch.percent-threshold>

This is a baseline tag that defines a maximum number of objects to keep in the edge server cache for non-cacheable prefetched objects:

```
<edgeservices:prefetch.cache.max-objects>1000</edgeservices:prefetch.cache.max-objects>
```

This is a baseline tag that defines a maximum total size of the cache for non-cacheable prefetched objects:

```
<edgeservices:prefetch.cache.max-total-size>10MB</edgeservices:prefetch.cache.max-total-size>
```

This is a baseline tag that defines how long to keep non-cacheable prefetched objects:

```
edgeservices:prefetch.cache.max-lifetime>1m</edgeservices:prefetch.cache.max-lifetime>
```

If desired, prefetching can be combined with other edge server features, such as path optimization, TCP connection optimization, content compression optimizations, and the like.

Thus, for example, to enable path optimization, the customer-specific, domain-specific configuration file may include a path optimization directive such as the following:

```
<forward:cache-parent>
    <status>on</status>
    <selection-method>SR</selection-method>
    <policy>performance</policy>
    <map>example.map.cdnroute.cdnsp.com</map>
    <SR.max-parents>2</SR.max-parents>
</forward:cache-parent>
```

In this example, the status attribute turns the function on for the domain, and the selection-method sets the method by which the edge server identifies its parents. When set to SR, the edge server uses the map name and the max-parents to form a hostname that resolves through DNS to the appropriate IP addresses of the alternative edge servers that are used for the go forward request. Thus, for example, the policy sets the order in which the edge server will contact the cache parents. When set to performance the edge server will use test object races to order the parents and the origin based on the speed of responses to a set of race requests. The map sets the base hostname the edge server will use to construct the final hostname it looks up in DNS. The max-parents attribute sets how many indirect routes the edge server will use. These are representative settings.

To enable edge server-to-edge server (or other client-server) TCP optimizations, the following metadata can be set in the configuration file, once again on a customer-specific, domain-specific, basis. In particular, the controls for changing the TCP settings are in a separator: network:tcp.transport. Within this separator, preferably there are two listable nodes, one to control the settings that are based on a size (and thus can take an integer as a value) and the other to control timeout setting (which takes a "delta time" as a value). The nodes may include:

```
network:tcp.transport.size
network:tcp.transport.timeout
```

Preferably, the structure of these nodes is the same. They each contain a status (to turn the node on or off, a parameter (the name of the parameter to be set), a direction (to define which connection this setting will control), and a value (the value to set for the parameter). The parameter may be one of: cwnd_init (initial congestion window), cwnd_ssinc (slow start increase), cwnd_cainc (congestion avoidance rate), cwr_dec (congestion reduction rate), and many others. The direction defines which connection this setting will control. The possible values are: edge-to-user, edge-to-origin, edge-to-parent, and edge-to-child. Thus, the following metadata illustrates how to adjust the TCP settings used for edge server-to-edge server communication. The first setting is for the edge-to-child direction, and it adjusts the initial congestion window. The initial congestion window is also adjusted for the edge-to-parent direction so that the child advertises an appropriately large window and can use that larger window for POST transactions:

```
<network:tcp.transport.size>
    <status>on</status>
    <value>6</value>
    <parameter>cwnd_init</parameter>
    <direction>edge-to-child</direction>
</network:tcp.transport.size>
<network:tcp.transport.size>
    <status>on</status>
    <value>6</value>
    <parameter>cwnd_init</parameter>
    <direction>edge-to-parent</direction>
</network:tcp.transport.size>
```

The following metadata can be included in the configuration file to facilitate content compression (e.g., from the edge server to the browser):

```
<edgeservices:lastmileacceleration.edge-browser>on<
.../edgeservices:lastmileacceleration.edge-browser>
    <match:response.header.
```

The various edge server routines that manage the metadata tag handling are implemented in software running on commodity hardware.

Having described our invention, what we claim is as follows:

1. A computer program product in a non-transitory computer readable medium adapted to be executed in a data processing system having a hardware element, comprising:
   program code to receive configuration data, the configuration data associated with a content provider domain of one of a set of content providers;
   program code operative as a given object associated with the content provider domain is being served to a requesting client, to scan a response body of the given object to identify one or more content objects identified in the response body that may be candidates for prefetching;
   program code operative for at least one content object identified in the response body that may be a candidate for prefetching, to create a request for the content object; and
   program code operative as the given object associated with the content provider domain is being served, to execute the request to attempt to fetch the content object if when a prefetching status for the content provider domain has been enabled and a given prefetch limit has not been exceeded, the prefetching status and the given prefetch limit being identified by the configuration data.

2. The computer program product as described in claim 1 wherein the given prefetch limit is one of: a number of prefetch requests, and an amount of bandwidth usage associated with the prefetch requests.

3. The computer program product as described in claim 2 wherein the number of prefetch requests has a first threshold value at which prefetching is stopped, and a second threshold value at which prefetching, once stopped, is reinitiated.

4. The computer program product as described in claim 2 wherein the amount of bandwidth usage associated with the prefetch requests has a first threshold value at which prefetching is stopped, and a second threshold value at which prefetching, once stopped, is reinitiated.

5. The computer program product as described in claim 2 further including setting a time-scale over which the given prefetch limit is evaluated.

6. The computer program product as described in claim 1 wherein the content object is cacheable.

7. The computer program product as described in claim 6 wherein the prefetch step further includes:
determining whether the content object is already cached on disk in the edge server; and
when the content object is already cached on disk in the edge server, moving the content object from disk to memory.

8. The computer program product as described in claim 1 wherein the content object is non-cacheable.

9. The computer program product as described in claim 8 further including program code to configure a unique identifier to prevent the content object from being delivered to any entity except the requesting client.

10. The computer program product as described in claim 1 wherein the scan is initiated if when a content-type associated with the given object has a given value.

11. The computer program product as described in claim 1 wherein the scan is initiated if when a response code associated with the given object has a given value.

12. The computer program product as described in claim 1 wherein the content object includes at least one prefetchable object associated therewith, and further including program code to perform a prefetching operation on the prefetchable object associated with the content object.

13. The computer program product as described in claim 1 wherein the content object has a domain that is the same as the content provider domain or different from the content provider domain.

14. The computer program product as described in claim 1 wherein the content object is fetched from one of: an origin server, and a parent edge server.

15. A computer program product in a non-transitory computer readable medium adapted to be executed in a data processing system having a hardware element, comprising:
program code to receive configuration data, the configuration data associated with a content provider domain of one of a set of participating content providers;
program code operative for each of first and second participating content providers, where the first participating content provider is distinct from the second participating content provider, to receive a customer-specific, domain-specific configuration file that includes one or more prefetching directives, and at least one other content delivery directive;
program code operative as a given object associated with a content provider domain is being served to a requesting client, to scan a response body of the given object to identify one or more content objects identified in the response body that may be candidates for prefetching;
program code operative for at least one content object identified in the response body that may be a candidate for prefetching, to create a request for the content object; and
program code operative as the given object associated with the content provider domain is being served, to execute the request to attempt to fetch the content object if when a prefetching status for the content provider domain has been enabled as indicated by the prefetching directive in the configuration file; and
program code operative to fetch a second content object associated with the content provider domain as indicated by the other content delivery directive in the configuration file.

16. The computer program product as described in claim 15 wherein the second content object is dynamic content and is fetched from the origin server.

17. The computer program product as described in claim 16 wherein the other content delivery directive in the configuration file controls the edge server to obtain the second content object via a path that includes at least one other edge server in the content delivery network.

18. The computer program product as described in claim 15 wherein the other content delivery directive in the configuration file is a directive to optimize a TCP connection parameter.

19. A computer program product in a non-transitory computer readable medium adapted to be executed in a data processing system having a hardware element, the data processing system having a data store in which is stored a customer-specific, domain-specific configuration file that includes a set of one or more content prefetching directives, comprising:
program code responsive to a receipt of a request for a given object to scan a response body of the given object as the given object is being served to identify one or more content objects in the response body that may be candidates for prefetching, to generate a request for at least one content object identified by the scan, and
program code to execute the request to attempt to prefetch the at least one content object in accordance with the one or more content prefetching directives in the configuration file, the one or more prefetching directives uniquely associated with a content provider domain associated with the given object and including a directive to enable prefetching.

20. The computer program product as described in claim 19 wherein the one or more content prefetching directives includes one of: a directive to identify a content type for which prefetching is enabled, a directive to identify a prefetching scanning method, a directive to indicate whether prefetching should be enabled if the proxy server connects to the origin server directly, a directive to indicate whether prefetching should be enabled if the given object was cached at the proxy server, a directive to manage prefetching of a non-cacheable content object, a directive indicating a maximum number of content objects to prefetch within the given object, a directive identifying a set of one or more content object element types for which prefetching is enabled, a directive to allow prefetching for a content object that has a domain that differs from the domain of the given object, a directive to allow recursive prefetching on at least one content object, and a directive to provide rate limiting to at least one prefetch request.

* * * * *